(12) United States Patent
Smythe et al.

(10) Patent No.: US 9,377,160 B1
(45) Date of Patent: Jun. 28, 2016

(54) DRYWALL FINISHING MATERIAL WITH TWIN-HINGE CONSTRUCTION

(75) Inventors: Timothy Smythe, Bend, OR (US); Douglas Wambaugh, Bend, OR (US)

(73) Assignee: CERTAINTEED GYPSUM AND CEILING MANUFACTURING, INC, Malvern, PA (US)

( * ) Notice: Subject to any disclaimer, the term of this patent is extended or adjusted under 35 U.S.C. 154(b) by 759 days.

(21) Appl. No.: 12/547,838

(22) Filed: Aug. 26, 2009

Related U.S. Application Data

(60) Provisional application No. 61/190,781, filed on Sep. 2, 2008.

(51) Int. Cl.
    *E04B 1/00* (2006.01)
    *F16M 13/02* (2006.01)

(52) U.S. Cl.
    CPC .................................. *F16M 13/022* (2013.01)

(58) Field of Classification Search
    CPC ..................................................... F16M 13/022
    USPC ........................................ 52/255, 254, 287.1
    See application file for complete search history.

(56) References Cited

U.S. PATENT DOCUMENTS

| | | | |
|---|---|---|---|
| 4,763,455 A * | 8/1988 | Schneller ........................ 52/255 |
| 5,131,198 A * | 7/1992 | Ritchie et al. ................. 52/287.1 |
| 5,313,755 A * | 5/1994 | Koenig, Jr. ...................... 52/255 |
| 5,604,001 A * | 2/1997 | Schold .......................... 428/41.8 |
| 5,778,617 A * | 7/1998 | Free ................................ 52/255 |
| 5,904,016 A * | 5/1999 | Koenig et al. ................... 52/255 |
| 6,073,406 A * | 6/2000 | Kearney ..................... 52/287.1 |
| 6,148,573 A | 11/2000 | Smythe |
| 6,363,673 B1 * | 4/2002 | Robertson ....................... 52/255 |
| 6,438,914 B1 * | 8/2002 | Robertson ....................... 52/255 |
| 6,447,872 B1 * | 9/2002 | Larson ............................ 428/77 |
| 6,615,557 B2 | 9/2003 | Smythe |
| 6,691,476 B1 * | 2/2004 | Kunz ............................ 52/287.1 |
| 6,779,313 B2 | 8/2004 | Smythe |
| 7,137,231 B2 * | 11/2006 | Harel ............................ 52/746.1 |
| 7,214,434 B2 * | 5/2007 | Dalgleish et al. ........... 428/537.5 |
| 7,383,668 B1 * | 6/2008 | Kunz ............................... 52/255 |
| 7,673,428 B1 * | 3/2010 | Smythe ........................... 52/255 |
| 2002/0083665 A1 * | 7/2002 | Razetto ........................ 52/288.1 |
| 2003/0131546 A1 * | 7/2003 | Kunz ............................... 52/255 |
| 2006/0059809 A1 * | 3/2006 | Smythe ........................... 52/255 |
| 2006/0059810 A1 * | 3/2006 | Budzik ........................... 52/255 |
| 2006/0070324 A1 * | 4/2006 | Daly ............................ 52/287.1 |
| 2006/0283115 A1 * | 12/2006 | Robertson ....................... 52/364 |
| 2007/0107336 A1 * | 5/2007 | Conboy ........................... 52/255 |

* cited by examiner

*Primary Examiner* — Mark Wendell

(74) *Attorney, Agent, or Firm* — Abel Law Group, LLP; Alexander H. Plache

(57) ABSTRACT

An improved corner trim material construction such that a pair of flanges of the material, normally approximately perpendicular to one another, may "flex", or change angle, relative to one another and the apex, or nose, of the material allowing the flanges to lay flat against the wall surface adjacent the corner onto which they are being bonded or attached. The present invention can use a single, twin or tri-hinge created by a groove running end-to-end to allow flexing.

9 Claims, 4 Drawing Sheets

DRYWALL FINISHING MATERIAL WITH TWIN-HINGE CONSTRUCTION

This application is related to and claims priority from U.S. Provisional Patent Application No. 61/190,781. Application No. 61/190,781 is hereby incorporated by reference.

BACKGROUND

1. Field of the Invention

The present invention relates generally to the field of drywall corner trim products and more particularly to a corner trim material constructed such that the flanges of the product are free to rotate (or change angle) relative to the apex, nose, or the opposite flange allowing one or both flanges to lay flat against the wall surface (adjacent the corner being finished) onto which they are being bonded or attached.

2. Description of the Prior Art

The various types of drywall corner trim finishing materials available for use today are well known. Some have been around for many years. The following description pertain to all constructions of existing products such as sharp 90 degree beads and trims & bullnose trims and L-Trim beads and trims.

The simplest of these materials is the metal or vinyl bead also referred to as nail on bead. This is a completely metal bead that is formed with a nose and two flanges at slightly less than 90 degrees to one another, such that it can be mechanically screwed, nailed, stapled, crimped or otherwise mechanically attached to the wall corner and enough joint compound is used to cover the attaching hardware and blend it into a smooth transition from the flat wall to a corner apex. The flanges are formed at less than 90 degrees so that during installation onto a corner of the outside edges of the flanges will be assured of being flush against the surface of the sheet rock with normal manufacturing tolerances. If the flanges are greater than 90 degrees apart the edges of the flanges will not lay flat against the sheet rock surface and finishing will be very time consuming and difficult since hiding the edges is required for a good wall finish appearance. Because the angle between flanges is necessarily less than 90 and the rigidity of the metal not allowing the flanges to be "flexed", the flanges of this material never lay flat against the wall creating air pockets underneath the installation and subsequently a weaker bond and requiring more joint compound to fill and taper the corner to a flat wall smooth surface appearance. It would be better if the flanges were able to "flex", or move angularly relative to one another, so the flanges could be laid flat against the wall.

Other types of corner finishing materials include paper faced metal, vinyl, and paper faced vinyl corner finishing products. These materials may be intended to be mechanically fastened (using hardware or crimping) or mudded onto the corner without using mechanical fasteners but they are subject to the same problems as the metal bead. The stiffness and construction of these materials and their inherent disadvantages are the same as described above.

Another product is a paper, polymer, paper lamination. These products are the highest quality of their type and functionally have the best blend of strength, flexibility and bonding ability. They are rigid yet flexible and impact resistant. They bond very well with joint compound forming a structural corner.

They are also shaped such that they are tapered and require very little mud to finish out. These materials may also include a central groove at the apex creating a linearly flexible or "hinge" line along the center, or apex, of the material. This central "hinge" combined with the flexural characteristics of the plastic of which it's made allows the flanges to flex, or change angle relative to the opposite flange or the apex. The flanges of this material subsequently are able to lay flatter against the sheet rock in turn insuring a better bond between the wall surface and an easier installation to blend, finish and feather to a smooth appearance. This invention is intended only to improve this particular products already good characteristics by adding additional grooves between the apex and flange to allow the flange angle to flex more readily to the angle of the corner being finished.

What is needed in the industry is a drywall corner finishing material constructed such that the flanges of this material are able to lay flat against the wall surface adjacent the corner being finished. Constructing the material according to the present invention will allow it's flanges to lay flat against the wall surface creating a stronger bond and create an easier corner to finish since it will inherently require less mud to finish. Such an invention would be particularly important on a corner trim material that employs an adhesive on the inside, or wall facing side of the flanges for bonding the material to the wall.

SUMMARY OF THE INVENTION

It is an object of the present invention to provide an improved corner trim material construction such that flanges of the material, normally approximately perpendicular to one another, may "flex", or change angle, relative to one another and the apex, or nose, of the material allowing the flanges to lay flat against the wall surface adjacent the corner onto which they are being bonded or attached. The present invention can use a single, twin or tri-hinge created by a groove running end-to-end to allow flexing.

DESCRIPTION OF THE DRAWINGS

Attention is now directed to several illustrations that aid in understanding the present invention.

Several drawings and illustrations have been presented to aid in understanding the present invention and to clarify its features. The scope of the present invention is not limited to what is shown in the figures.

DESCRIPTION OF THE INVENTION

The present invention relates to a drywall finishing trim material with a twin or tri-hinge construction, that is a material constructed with at least one groove along the length of the material positioned between the nose or apex and the flange. The groove creates a portion of the material that is locally thinner and subsequently more flexible than either the nose (or apex) and the flange(s). In turn these locally thinner grooves create a flexible hinge line along the length of the material about which the flange may rotate relative to the nose and/or the optional opposite flange. This hinge line allows the flanges of the material to lie flat against the sheet rock onto which they are being attached or bonded creating a stronger bond and an easier installation to finish, or feather, to a seamless smooth wall appearance.

Figure 1:
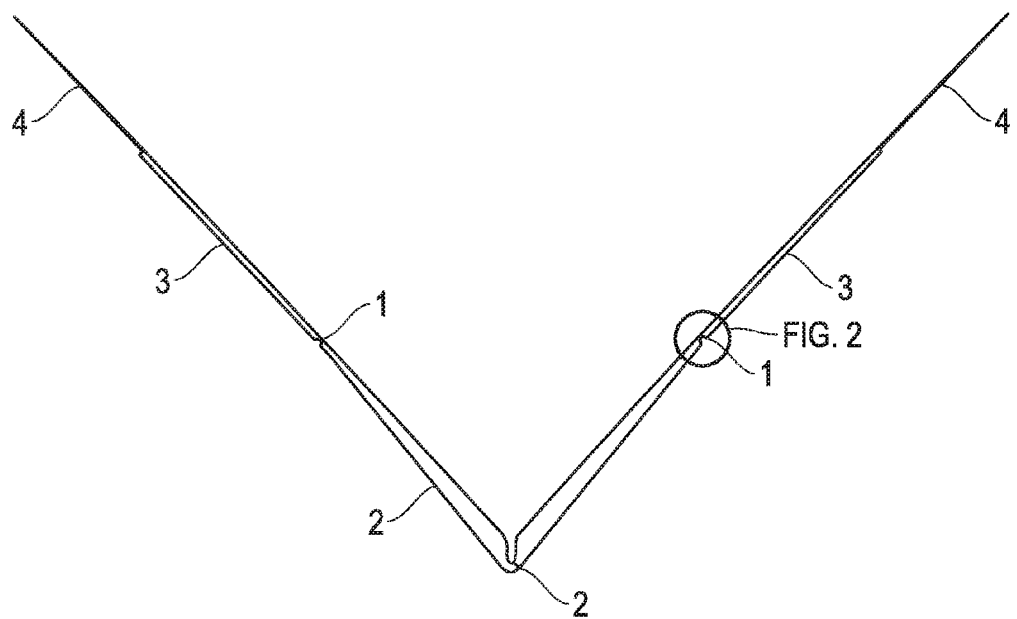
FIG. 1 shows one possible cross sectional profile of a corner finishing shape constructed with the present invention.

FIG. 1 shows one possible cross sectional profile of a corner finishing shape constructed with the present invention. A groove (1) is shown along with an apex (2), flange (3) and optional paper flap (4). Also shown is an optional adhesive coating (6) on the inside (wall facing side) of the material which may be a possible bonding medium used to attached the material to the wall.

The corner trim material can be made of metal, plastic, paper, laminations of any type. The actual material of which the corner trim is constructed may be the same across the material. In other words, if the corner trim is made of vinyl, it can be vinyl everywhere across the cross section of the profile. If it's metal, or some laminated construction, it can be metal, or a laminated construction, throughout across the cross section of the profile. No other, different materials are needed in the construction to achieve the flexible flange. The flexible flange is achieve by the groove (or local thinning) somewhere between the apex and the flange, running the length of the material. The locally thinned groove creates a weak line along the length of the material becoming locally flexible.

Figure 2:
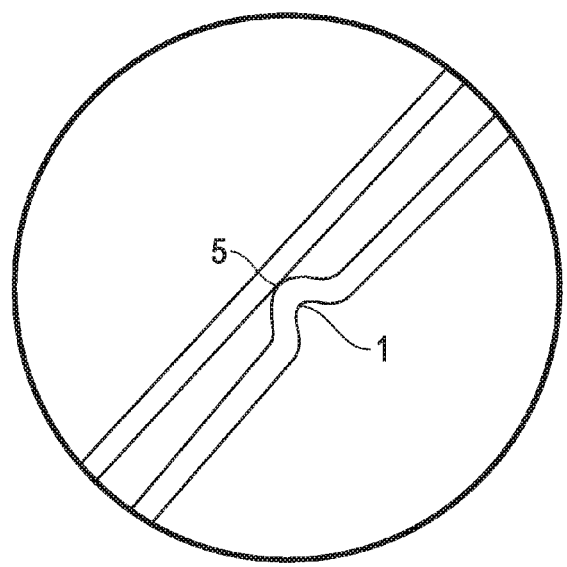
FIG. 2 shows a blown up sub-view from FIG. 1 of the groove (1) and the resulting thin spot (5) of the embodiment of FIG. 1.

FIG. 2 shows a blown up sub-view from FIG. 1 of the groove (1) and the resulting thin spot (5) about which the flange (3) may now rotate due to the locally increased flexibility imparted by the groove (1). Note that corner finishing material can be simply compressed to a locally thin spot (5) across the profile that runs the length of the material.

Figure 3:
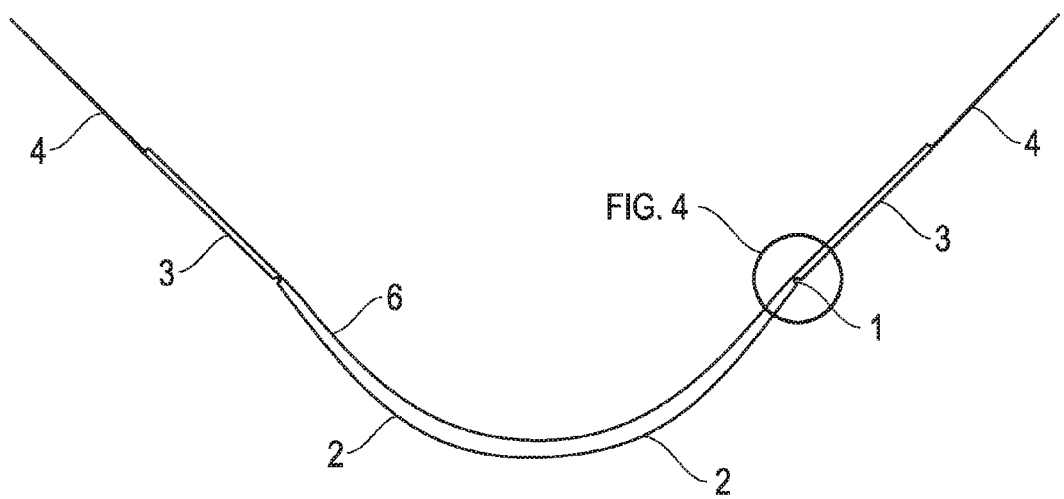
FIG. 3 shows a bullnose embodiment of the present invention.

FIG. 3 shows the same configuration described in FIG. 1 but with the invention being applied to a bullnose (rounded corner) profile corner finishing material common in the industry. The groove (1), apex (2), flange (3), optional paper flap (4) and adhesive coating (6) may be seen as described above.

Figure 4:
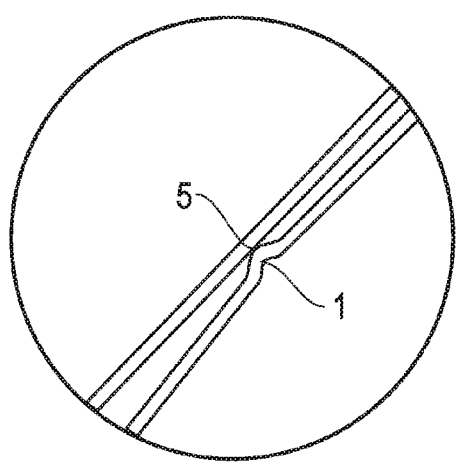
FIG. 4 shows a blown up sub-view from FIG. 3 of the groove (1) and the resulting thin spot (5) of the embodiment of FIG. 3.

FIG. 4 shows a blown up sub-view from FIG. 3 of the groove (1) and the resulting thin spot (5) about which the flange (3) may now rotate due to the locally increased flexibility imparted by the groove (1). Note that corner finishing material is simply compressed to a locally thin spot (5) across the profile which runs the length of the material.

Figure 5:
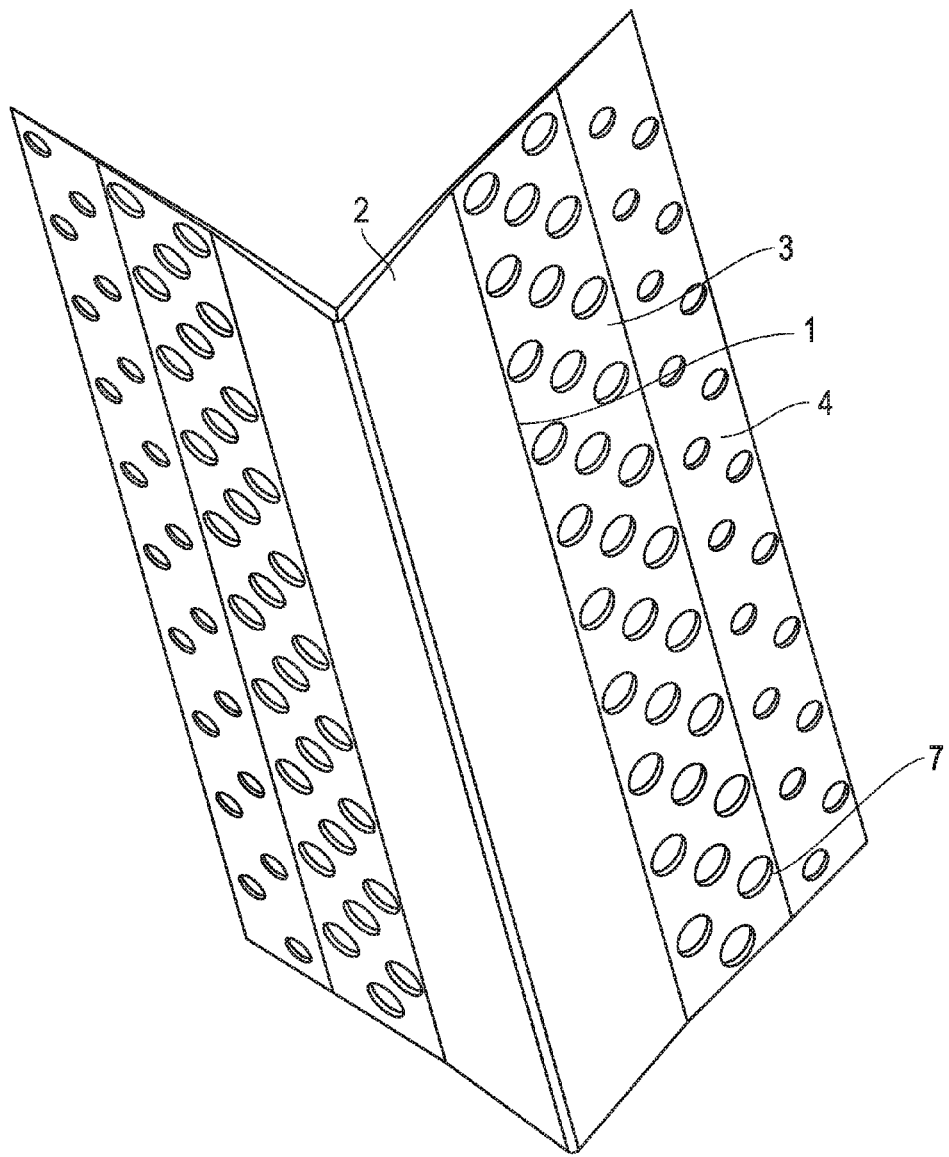
FIG. 5 shows a length of the material in FIG. 1 at such an angle that the groove (1), apex (2), flange (3), and optional paper flap (4) & and perforations (7) common in the industry can be seen from a different perspective.

FIG. 5 shows a length of the material from the embodiment of FIG. 1 at an angle where the groove (1), apex (2), flange (3), and optional paper flap (4) and perforations (7) common in the industry can be seen.

The present invention may be employed on any corner trim material construction, even metal, to achieve the same result. The present invention is independent of any apex or flange thickness or the presence of a taper, step or other shapes currently used for various reasons in the industry. The piece can be made from any rigid or semi-rigid material including plastic with vinyl preferred, metal such as steel or aluminum or any other suitable material.

The present invention may be constructed with any number of hinges as described. It is possible to make models with tri-hinge (a first hinge on one side and two hinges on the other side) as well as models with four or more hinges. Any number of such hinges is within the scope of the present invention. The hinges in various embodiments may be located anywhere along the flange of apex piece.

Figure 6:
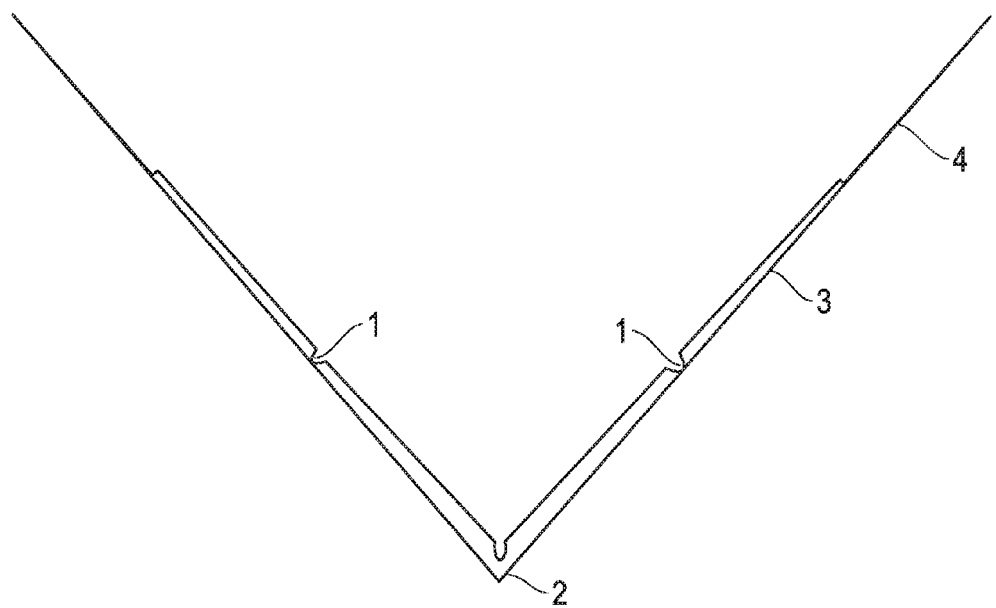
FIG. 6 shows an embodiment with several grooves between the apex and a flange.

FIG. 6 shows an embodiment with the groove (1) on the back, rather than the back of the front of the piece.

Figure 7:
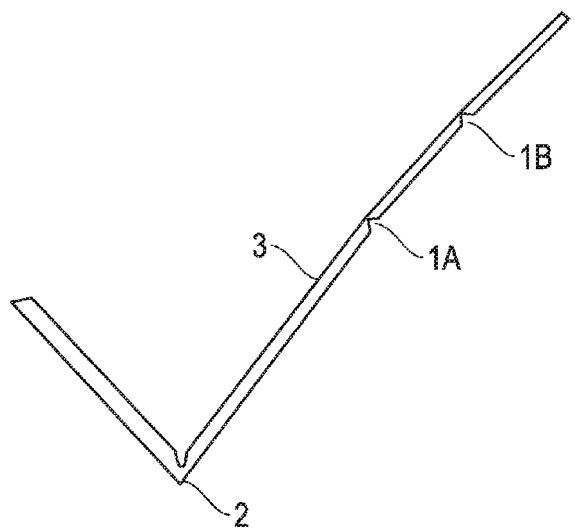
FIG. 7 shows an embodiment with a flange having two grooves.

FIG. 7 shows an embodiment with several grooves (1A, 1B) between the apex (2) and the flange (3). Multiple grooves aid in flattening and fitting the piece.

It should be noted that the apex and/or flanges may be coated with paper. Also a paper flap can extend beyond the semi-rigid flange on any of the embodiments of the present invention.

Several descriptions and illustrations have been presented to aid in understanding the present invention. One skilled in the art will realize that numerous changes and variations are possible without departing from the spirit of the invention. Each of these changes and variations is within the scope of the present invention.

We claim:

1. A drywall corner finishing piece suitable for finishing sheet rocked wall corners comprising:
   a pair of elongated flanges, including a first flange and a second flange, connected to a central elongated member, said elongated member having an apex;
   a plurality of parallel longitudinal grooves running end-to-end on each of said flanges, said grooves running lengthwise along the piece end to end, the grooves forming multiple hinge lines on each flange about which the flange can rotate angularly relative to the apex and central elongated member.

2. The drywall corner finishing piece in claim 1 further comprising adhesive on the wall side surface of the piece.

3. The drywall corner finishing piece in claim 1 further comprising perforations along the flanges of said piece.

4. The drywall corner finishing piece in claim 1 further comprising a paper flap extending from at least one flange outward away from the apex.

5. The drywall corner finishing piece of claim 1 wherein said piece is made from at least one of the group consisting of plastic, aluminum and steel.

6. The drywall corner finishing piece of claim 1 wherein said piece is covered on at least one surface with paper.

7. The drywall corner finishing piece of claim 1 wherein the grooves are on the room side of the piece.

8. The drywall corner finishing piece of claim 1 wherein said apex has a sharp point.

9. The drywall corner finishing piece of claim 1 wherein said apex is bullnose.

\* \* \* \* \*